United States Patent [19]
Havens et al.

[11] Patent Number: 6,165,922
[45] Date of Patent: Dec. 26, 2000

[54] PHOTOCHROMIC GLASS AND LENS

[75] Inventors: Thomas G. Havens, Painted Post; David J. Kerko; Brent M. Wedding, both of Corning, all of N.Y.

[73] Assignee: Corning S.A., Avon Cedex, France

[21] Appl. No.: 09/391,744

[22] Filed: Sep. 8, 1999

Related U.S. Application Data

[63] Continuation-in-part of application No. 09/289,520, Apr. 9, 1999, and a continuation-in-part of application No. PCT/US98/21876, Oct. 15, 1998.
[60] Provisional application No. 60/064,901, Nov. 7, 1997.

[51] Int. Cl.[7] .................................................. C03C 4/06
[52] U.S. Cl. .............................. 501/13; 501/66; 501/67; 501/77
[58] Field of Search ............................. 501/13, 66, 67, 501/77

[56] References Cited

U.S. PATENT DOCUMENTS

| | | | |
|---|---|---|---|
| 3,208,860 | 9/1965 | Armistead et al. | 106/54 |
| 4,190,451 | 2/1980 | Hares et al. | 106/47 |
| 4,284,686 | 8/1981 | Wedding | 428/334 |
| 5,104,831 | 4/1992 | Behr et al. | 501/13 |
| 5,300,465 | 4/1994 | Grateau et al. | 501/13 |
| 5,381,193 | 1/1995 | Wedding | 351/163 |
| 5,424,255 | 6/1995 | Kassner | 501/13 |
| 5,639,701 | 6/1997 | Kerko et al. | 501/13 |
| 5,728,189 | 3/1998 | Kerko et al. | 65/32.1 |
| 5,973,865 | 10/1999 | Havens et al. | 359/885 |

*Primary Examiner*—Karl Group
*Attorney, Agent, or Firm*—Milton M. Peterson

[57] ABSTRACT

A fixed tint, photochromic glasses and sunglass lenses produced therefrom. The glasses have $R_2O$—$Al_2O_3$—$B_2O_3$—$SiO_2$ base compositions, contain silver chloride and bromide contents as photochromic constituents and 0.22–0.38% NiO and 0.034–0.060% CoO, both by weight percent, as glass colorants, the NiO:CoO ratio being in the range of 5.5–7.2:1.

9 Claims, 1 Drawing Sheet

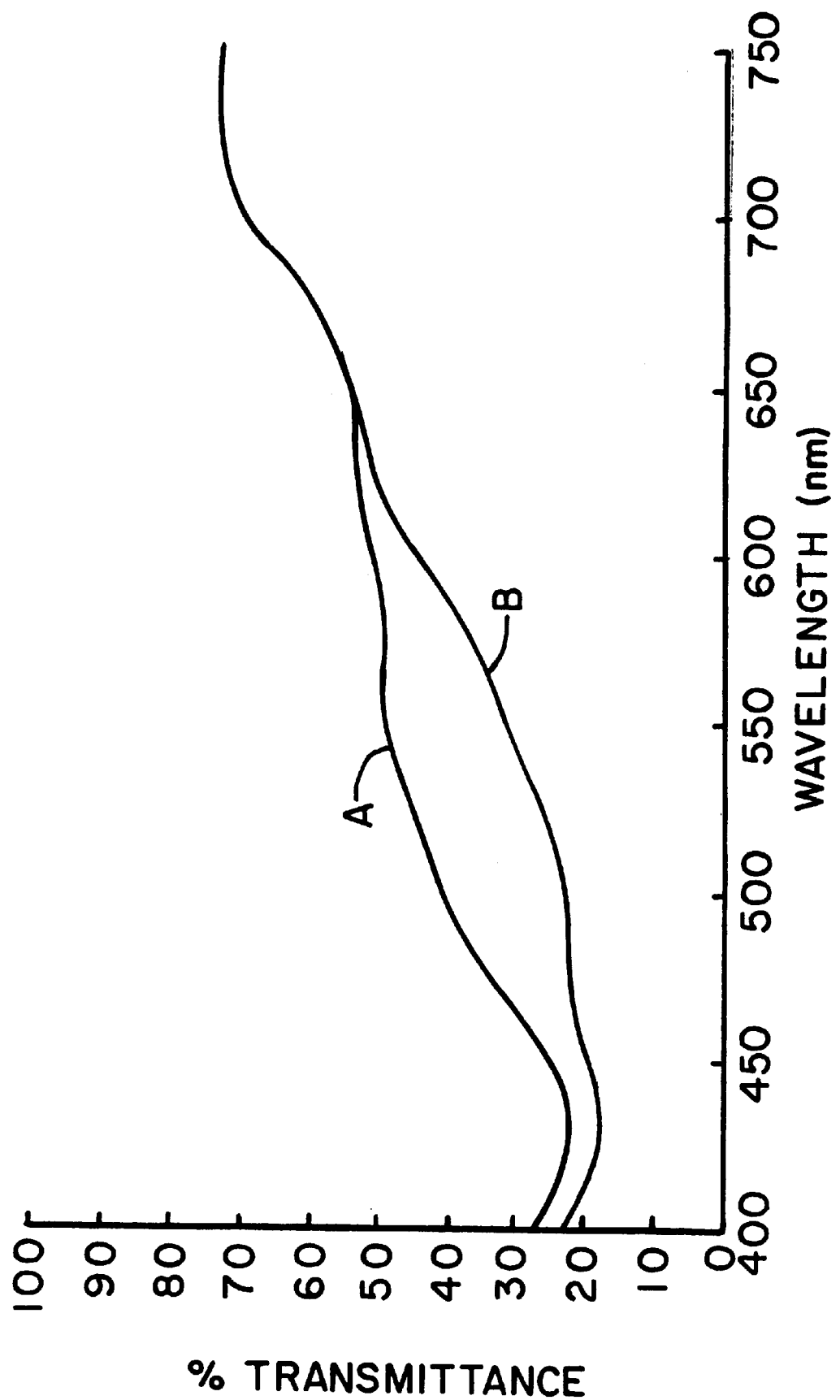

PHOTOCHROMIC GLASS AND LENS

This application is a continuation-in-part of U.S. application Ser. No. 09/289,520, filed Apr. 9, 1999, which claims the benefit of U.S. Provisional Ser. No. 60/064,901, filed Nov. 7, 1997, and Application No. PCT/US98/21876, filed Oct. 15, 1998, all entitled PHOTOCHROMIC GLASS AND LENS, and filed in the names of Thomas G. Havens, David J. Kerko and Brent M. Wedding.

FIELD OF THE INVENTION

Fixed tint, photochromic glasses, and sunglass lenses produced from such glasses.

BACKGROUND OF THE INVENTION

Photochromic glasses characteristically darken under the influence of short wavelength radiation, and fade when the radiation source is removed. Such glasses have become well-known since their disclosure in U.S. Pat. No. 3,208,860 (Armistead et al.).

Initially, the active photochromic ingredient was crystals of a silver halide, other than the fluoride. Subsequently, glasses containing copper and cadmium halides were found to be photochromic, but the silver halide glasses have remained the commercial choice.

Continuing efforts were made to improve the early glasses with respect to both their photochromic properties and their other properties necessary for ophthalmic use. These efforts led to U.S. Pat. No. 4,190,451 (Hares et al.). This patent discloses an $R_2O$—$Al_2O_3$—$B_2O_3$—$SiO_2$ base glass containing, as essential constituents for photochromism, Ag 0.15–0.3%, 0.1–0.25% Cl, 0.1–0.2% Br and 0.004–0.02% CuO by weight. The patent also discloses the possibility of adding up to one percent transition metal oxides, such as CoO, NiO and $Cr_2O_3$, and up to five percent rare earth metal oxides, such as $Er_2O_3$, as glass colorants.

A composition for a commercial, photochromic sunglass was developed on the basis of the Hares et al. patent teachings. This glass has a base glass composition, as calculated in parts by weight from the glass batch, of

| | | | |
|---|---|---|---|
| $SiO_2$ | 56.6 | $Na_2O$ | 4.1 |
| $Al_2O_3$ | 6.3 | $K_2O$ | 5.7 |
| $B_2O_3$ | 18.1 | $ZrO_2$ | 4.6 |
| $Li_2O$ | 1.8 | $TiO_2$ | 1.9 |

The glass contains photochromic elements as follows:

| | |
|---|---|
| Ag | 0.24 |
| Cl | 0.21 |
| Br | 0.17 |
| CuO | 0.007 |

The glass also has 0.190% NiO and 0.024% CoO added to impart a fixed tint.

A 2 mm. thick lens of this glass has a faded transmittance of 69%. When fired in hydrogen to provide parameters designed to produce a pleasing coloration, the faded transmittance of the glass is reduced to 45+/−2%. However, a lens having an even lower, faded transmittance after hydrogen treatment was found to be desirable.

This could be achieved by a more extended hydrogen treatment in terms of time and/or temperature. However, such extended treatment resulted in a color shift that created a very undesirable cosmetic appearance. Also, after UV darkening, as by sunlight, a sunglass lens failed to meet the ISO/ANSI sunglass requirements.

To achieve the desired transmittance with acceptable color, it became necessary to apply a combination of vacuum-deposited coatings, including a neutral density, durable, thin film coating, to the $H_2$-fired glass. This expedient effectively provided a faded transmittance of about 26% and a UV-darkened transmittance of about 12% at 25° C. However, the extra processing added considerable cost to the lens.

The present invention is predicated on discovery that the need for a coating can be avoided by modifying and controlling the amounts of the colorant oxide. The resulting lens, in a standard, 2.0+/−0.1 mm. thickness, satisfies the ISO/ANSI requirements, as well as other ophthalmic requirements. These include a refractive index of about 1.53, an ability to be chemically strengthened to meet the FDA ball-drop test and a cosmetically acceptable appearance.

It is then a basic purpose of the present invention to produce an improved, $H_2$-fired, darker sunglass lens blank.

Another purpose is to provide a fixed tint, photochromic glass from which such lens blank can be produced, and from which, in the unfired state, a brown photochromic glass is produced.

A further purpose is to provide a sunglass lens that possesses the properties of a lens having a vacuum-deposited coating, while avoiding the costly, coating procedure.

Another purpose is to provide a fixed tint, photochromic glass lens that has an acceptable color and diminished transmission in the undarkened state, but still satisfies ISO/ANSI sunglass requirements when darkened.

A still further purpose is to accomplish the forgoing purposes while modifying only the colorant contents in a commercial glass.

SUMMARY OF THE INVENTION

The invention resides in an $R_2O$—$Al_2O_3$—$B_2O_3$—$SiO_2$ base glass containing silver chloride and bromide as photochromic constituents and 0.22–0.38% NiO and 0.034–0.060% CoO as glass colorants with the ratio of NiO:CoO being 5.5–7.2:1 by weight.

The invention further resides in an ophthalmic lens composed of such glass, having a refractive index of about 1.523 and a thickness of 1.0–2.0+/−0.1 mm.

PRIOR ART

Patent literature known to Applicants and deemed of possible relevance is supplied separately.

BRIEF DESCRIPTION OF THE DRAWINGS

The single FIGURE in the accompanying drawing is a graphical representation showing transmittance curves for a glass in accordance with the present invention before and after the glass is fired in a reducing atmosphere.

DESCRIPTION OF THE INVENTION

The present invention arose from studies designed to obtain a lens blank from a photochromic glass that has a dark, fixed tint and that has a low transmittance in the faded state, but still meets ISO/ANSI sunglass requirements when the lens is exposed to UV radiation. As indicated, this could be achieved with a coating, but that involved added processing.

We have now discovered that the desired lower transmittance in the hydrogen-fired glass can be achieved by employing proper amounts of the glass colorants, NiO and CoO, that produce the dark fixed tint. We have further found that the glass, as melted, that is, in the unfired state, provides a photochromic glass having a pleasing, brown color. Thus, the $R_2O$—$Al_2O_3$—$B_2O_3$—$SiO_2$ base glass, including the photochromic constituents, remains unchanged from that heretofore commercially available. This, of course, is desirable since schedules for glass strengthening can remain unchanged. Also, no changes in glass melting procedures are required.

The base glass, as calculated from the batch on an oxide basis, consists essentially of:

| | | | |
|---|---|---|---|
| $SiO_2$ | 20–65% | $Na_2O$ | up to 9% |
| $Al_2O_3$ | 5–25% | $K_2O$ | up to 17% |
| $B_2O_3$ | 14–23% | $R_2O$ | 8–20% |
| $Li_2O$ | up to 2.5% | $ZrO_2$ | up to 6% |
| | | $TiO_2$ | up to 3% |

In addition, the glass contains, as essential ingredients to impart photochromic properties, in weight %:

| | |
|---|---|
| Ag | 0.15–0.3% |
| Cl | 0.1–0.25% |
| Br | 0.1–0.2% |
| CuO | 0.004–0.02% |

As indicated earlier, the glass colorants employed, NiO and CoO, remain the same. The surprising fact is that the desired color properties and photochromic characteristics can be achieved by simply making a marked change in the amounts and proportions of these colorants that are incorporated in the parent, base glass.

The color effects obtainable with the colorants NiO and CoO are surprisingly unpredictable. This may be seen by comparing the fixed tints that can be produced in an identical, photochromic, base glass. The only compositional change is in the amounts and ratios of the glass colorants, NiO and CoO.

TABLE I, below, sets forth the amounts and ratios, in weight %, of the colorants NiO and CoO employed to produce two distinctly different fixed tints, one a gray and the other a brown, in the same base glass.

TABLE I

| | Brown | Gray |
|---|---|---|
| NiO | 0.36% | 0.14% |
| CoO | 0.054% | 0.08% |
| NiO/CoO | 6.7 | 1.7 |

This difference in fixed tint color is not only surprising, but most fortuitous. It enables obtaining two distinct tints using a single base glass composition.

For present purposes, the colorant oxides, NiO and CoO, are employed in amounts ranging from 0.22–0.38% NiO and 0.034–0.060% CoO by weight. The ratios of the oxides should range from 5.5–7.2:1. The range of transmittance values before $H_2$-firing, and UV exposure, will be in the range of 37–55%. After $H_2$-firing, the value will be in the range of 20–25%. The currently preferred glass has the NiO and CoO contents and ratio shown under "Brown" in TABLE I, and has a faded transmission value of 39±2% after $H_2$-firing.

The amounts and ratio of the colorant oxides employed will depend on the shade desired, the transmission required and the article thickness. Thus, to obtain a given set of properties, the oxide amounts employed will vary inversely with glass thickness. The standard lens thickness is 2.0±0.1 mm. Clip-on lenses, not being required to meet the strength requirements of regular lenses, are thinner. Customarily, they are 1.6±0.1 mm. in thickness. It has also been proposed to employ a lens having a 1.0±0.1 mm. thickness in a laminated, polarizing lens embodying a polarizing, plastic film.

The proposed upper limits for the colorant oxides, that is 0.38% NiO and 0.060% CoO, are primarily imposed by the effects that larger amounts have on photochromic behavior. Such larger amounts appear to have a poisoning effect on photochromic behavior. In particular, the fading rate from a darkened state is much slower.

To arrive at the desired color package, a series of color glass melts were made using the commercial photochromic glass composition shown earlier. The two composition variables were the NiO and CoO contents. The criticality of the ranges specified can be seen from a comparison of 2 mm. thick lenses that were processed from pressings from each of the six melts shown in TABLE II below. The TABLE reports analyzed contents for NiO and CoO in weight percent, and the luminous transmittance (LT) values as calculated for each glass. The calulations were made from measurements on the lenses before $H_2$-firing, and prior to UV or sunlight exposure.

TABLE II

| | NiO | CoO | LT (%) |
|---|---|---|---|
| 1 | 0.19 | 0.024 | 67 |
| 2 | 0.24 | 0.031 | 55 |
| 3 | 0.29 | 0.039 | 50 |
| 4 | 0.30 | 0.046 | 46 |
| 5 | 0.36 | 0.054 | 39 |
| 6 | 0.38 | 0.060 | 37 |

It will be appreciated that the final color properties are obtained by heat treating a lens in a reducing atmosphere. A virtue of the present invention is that the standard treatment heretofore used is equally effective with the present glass. This would be expected, since the photochromic constituents, particularly the silver, remain unchanged. Silver is the constituent affected by the reducing treatment.

The standard treatment is heating in a pure hydrogen atmosphere for about 12–13 minutes at 385° C. Any treatment providing an equivalent effect is contemplated. Since equipment and other influences will vary, a treatment in the ranges of 350–400° C., and a period of 10–15 minutes, should prove satisfactory. It may be necessary, under some circumstances, to use a diluted hydrogen atmosphere. This will require a longer heat treatment up to about thirty minutes.

Since the base glass composition remains unchanged, the lenses of the invention may be strengthened in known manner to meet FDA requirements. Strengthening may be accomplished by chemical tempering in well known manner.

Photochromic behavior will also be developed in the usual manner. Thus, the glass, after forming, may be heat treated at about 651° C. for thirty to forty minutes to precipitate in the glass the requisite, silver halide crystals.

Two pairs of polished samples, one pair having a nominal thickness of 2 mm., the other pair having a nominal thickness of 1 mm., were prepared for comparison. The glass of one pair of samples, designated N, corresponded to Example 4 in TABLE II and contained 0.30% NiO and 0.046% CoO. The glass of the other pair, designated M, was the commercial glass noted earlier and contained 0.19% NiO and 0.024% CoO. The latter is the glass that gave rise to the present invention.

TABLE III compares the transmissions of the four glass samples after various treatments. The treatments were (1) the glass as formed and untreated (before $H_2$), (2) after $H_2$-firing (after $H_2$), (3) with a neutral density coating (coated), (4) after darkened with UV radiation (darkened). The $H_2$-firing was in a 100% hydrogen atmosphere using the standard commercial cycle of 12–13 minutes at 385° C.

TABLE III

|  | M (2 mm.) | M (1 mm.) | N (2 mm.) | N (1 mm.) |
| --- | --- | --- | --- | --- |
| Before $H_2$ | 68.5 | 78.5 | 46 | 64 |
| After $H_2$ | 45 | 49.5 | 21 | 42 |
| Coated | 26 | NA | NA | NA |
| Darkened | 12 |  | 10 |  |

The single FIGURE in the accompanying drawing shows the spectral transmittance curves for the sample of the present glass. The curve based on measurements on the sample before the hydrogen treatment is designated A. The curve, as measured on the sample, after firing in hydrogen, is designated B. In the FIGURE, spectral wavelength is plotted on the horizontal axis and transmittance in percent is plotted on the vertical axis.

Tristimulus values X, Y, and Z, were computed from the indicated measurements using a weighted ordinate method with the 1931 CIE Standard Observer and Illuminant C. Chromaticity coordinates, x and y, and luminous transmittance, Y, values, are given in TABLE IV below. Columns 1 and 2 show, respectively, the measurements made on an unfired and fired sample of the standard commercial glass. Columns 3 and 4 show, respectively, the measurements made on an unfired and fired sample of the present new glass.

TABLE IV

| Parameter | 1 | 2 | 3 | 4 |
| --- | --- | --- | --- | --- |
| x | 0.3410 | 0.3815 | 0.3673 | 0.4394 |
| y | 0.3455 | 0.3392 | 0.4394 | 0.3704 |
| Y | 70.0 | 48.0 | 40.0 | 23.0 |

We claim:

1. A fixed tint, photochromic glass having an $R_2O$—$Al_2O_3$—$B_2O_3$—$SiO_2$ base composition, containing silver chloride and bromide contents as photochromic constituents, and 0.22–0.38% by weight NiO and 0.034–0.060% by weight CoO as glass colorants, the weight ratio of NiO:CoO being 5.5–7.2:1.

2. A glass in accordance with claim 1 containing as essential constituents to impart photochromic properties 0.15–0.3% Ag, 0.1–0.25% Cl, 0.1–0.2% Br and 0.004–0.02% CuO by weight.

3. A glass in accordance with claim 1 wherein the base glass composition, exclusive of photochromic constituents and glass colorants and in weight percent on an oxide basis, consists essentially of:

| $SiO_2$ | 20–65% | $Na_2O$ | up to 9% |
| --- | --- | --- | --- |
| $Al_2O_3$ | 5–25% | $K_2O$ | up to 17% |
| $B_2O_3$ | 14–23% | $R_2O$ | 8–20% |

-continued

| $Li_2O$ | up to 2.5% | $ZrO_2$ | up to 6% |
| --- | --- | --- | --- |
|  |  | $TiO_2$ | up to 3%. |

4. A glass in accordance with claim 1 having a base glass composition containing the following oxides in weight percent in the approximate amounts of:

| $SiO_2$ | 56.6 | $Na_2O$ | 4.1 |
| --- | --- | --- | --- |
| $Al_2O_3$ | 6.3 | $K_2O$ | 5.7 |
| $B_2O_3$ | 18.1 | $ZrO_2$ | 4.6 |
| $Li_2O$ | 1.8 | $TiO_2$ | 1.9 | and containing photochromic constituents as analyzed in weight percent:

| Ag | 0.24 |
| --- | --- |
| Cl | 0.21 |
| Br | 0.17 |
| CuO | 0.007 | and containing colorants as analyzed in weight percent:

| NiO | 0.36% |
| --- | --- |
| CoO | 0.054% |
| NiO/CoO | 6.7. |

5. A fixed tint, photochromic sunglass lens having a refractive index of 1.53, capable of being chemically strengthened, having a thickness of 1.0–2.0 +/−0.1 mm., having an $R_2O$—$Al_2O_3$—$B_2O_3$—$SiO_2$ base glass composition containing silver chloride and bromide contents as photochromic constituents and containing, as glass colorants to impart a fixed tint, 0.22–0.38% NiO and 0.034–0.060% CoO by weight and in a weight ratio of 5.5–7.2:1.

6. A sunglass lens in accordance with claim 5 wherein the glass lens has a thickness of 2.0+/−0.1 mm. and a brown fixed tint is imparted by the colorant contents.

7. A sunglass lens in accordance with claim 5 in which the glass contains, as essential constituents to impart photochromic properties: Ag 0.15–0.3%, 0.1–0.25% Cl, 0.1–0.2% Br and 0.004–0.02% CuO.

8. A sunglass lens in accordance with claim 5 in which the lens has a base glass composition, exclusive of photochromic constituents and glass colorants, that consists essentially of, in weight percent on an oxide basis:

| $SiO_2$ | 20–65% | $Na_2O$ | up to 9% |
| --- | --- | --- | --- |
| $Al_2O_3$ | 5–25% | $K_2O$ | up to 17% |
| $B_2O_3$ | 14–23% | $R_2O$ | 8–20% |
| $Li_2O$ | up to 2.5% | $ZrO_2$ | up to 6% |
|  |  | $TiO_2$ | up to 3%. |

9. A sunglass lens wherein the lens has a glass composition as set forth in claim 4.

* * * * *